(12) United States Patent
Bumgardner et al.

(10) Patent No.: US 11,118,849 B2
(45) Date of Patent: Sep. 14, 2021

(54) COMPUTER AIDED MEASURING SYSTEM (CAMS) TEMPERATURE REPORTERS

(71) Applicant: THE BOEING COMPANY, Chicago, IL (US)

(72) Inventors: Mark D. Bumgardner, Edmonds, WA (US); Jonathan A. Schweiger, Seattle, WA (US); Timothy W. Randich, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 494 days.

(21) Appl. No.: 14/954,079

(22) Filed: Nov. 30, 2015

(65) Prior Publication Data

US 2017/0153073 A1 Jun. 1, 2017

(51) Int. Cl.
*F28F 27/00* (2006.01)
*B64F 5/10* (2017.01)
(Continued)

(52) U.S. Cl.
CPC .............. *F28F 27/00* (2013.01); *B64F 5/10* (2017.01); *F28C 3/005* (2013.01); *G01K 3/14* (2013.01);
(Continued)

(58) Field of Classification Search
CPC .......... F28F 27/00; B64F 5/0009; B64F 5/60; B64F 5/00; F28C 3/005; G01K 3/14;
(Continued)

(56) References Cited

U.S. PATENT DOCUMENTS

| 4,395,886 A | * | 8/1983 | Mayer | ..................... F25B 13/00 62/160 |
| 4,421,268 A | * | 12/1983 | Bassett | ................... F23N 1/062 236/10 |

(Continued)

FOREIGN PATENT DOCUMENTS

| CN | 202002747 U | 10/2011 |
| CN | 102353469 A | 2/2012 |

(Continued)

OTHER PUBLICATIONS

English translation of Japanese Office Action for Application 2016220678, dated Jul. 7, 2020 (Year: 2020).*

(Continued)

*Primary Examiner* — Tho V Duong
*Assistant Examiner* — Raheena R Malik
(74) *Attorney, Agent, or Firm* — Patterson + Sheridan, LLP (57) ABSTRACT

Examples disclosed herein relate to methods and apparatus for controlling the temperature of large scale structures during manufacturing operations. A structure or surface when measured by Computer Aided Measuring Systems (CAMS) preferably remains a predetermined constant temperature with minimum variance. The manufacturing system includes a first temperature sensor, a second temperature sensor, a plurality of temperature regulation devices, and a processor, all in wireless communication. During performance of a CAMS process on a large scale structure or surface, a recorded temperature value of the structure or surface is communicated. A determination is made based on the recorded temperature value to operate the plurality of temperature regulation devices to control the temperature of targeted areas of the structure or surface. The temperature regulation devices are monitored and controlled such that (Continued)

the structure or surface is stabilized and distortion is prevented during the CAMS process.

20 Claims, 4 Drawing Sheets

(51) Int. Cl.
*F28C 3/00* (2006.01)
*G05D 23/19* (2006.01)
*G01K 3/14* (2006.01)
*H04W 4/80* (2018.01)
*F28D 21/00* (2006.01)

(52) U.S. Cl.
CPC . *G05D 23/1934* (2013.01); *F28D 2021/0021* (2013.01); *H04W 4/80* (2018.02)

(58) Field of Classification Search
CPC ........... G05D 23/1934; G05D 23/1932; G05D 23/193; H04W 4/80; F28D 2021/0021; B64G 1/50
USPC .................................................. 165/203, 205
See application file for complete search history.

(56) References Cited

U.S. PATENT DOCUMENTS

| | | | | |
|---|---|---|---|---|
| 4,907,417 A * | 3/1990 | Forsythe | .............. | B67D 1/0864 62/199 |
| 4,907,418 A * | 3/1990 | DeFazio | ................. | E04H 4/129 165/159 |
| 5,233,283 A * | 8/1993 | Kennedy | .............. | A61C 19/004 320/115 |
| 5,261,443 A * | 11/1993 | Walsh | ................. | F24D 17/0078 122/13.3 |
| 5,347,821 A * | 9/1994 | Oltman | ................... | F04C 28/28 62/129 |
| 5,479,983 A * | 1/1996 | Fischer | ................. | B64D 13/00 165/205 |
| 6,009,356 A * | 12/1999 | Monroe | ............. | B64D 45/0015 340/439 |
| 6,257,265 B1 * | 7/2001 | Brunner | ................... | A61M 5/44 137/1 |
| 6,259,074 B1 * | 7/2001 | Brunner | ................... | A61M 5/44 219/494 |
| 6,493,827 B1 * | 12/2002 | Mueller | ................ | G06F 11/327 713/300 |
| 6,826,456 B1 * | 11/2004 | Irving | ...................... | G06F 1/20 361/695 |
| 7,100,582 B1 * | 9/2006 | Bach | ....................... | F02B 43/10 123/198 DB |
| 7,775,447 B2 * | 8/2010 | Scherer | .................. | B64D 13/00 165/203 |
| 7,802,732 B2 * | 9/2010 | Scherer | .................. | B64D 13/00 165/205 |
| 8,015,395 B1 * | 9/2011 | Lewis | ..................... | G06F 1/305 360/101 |
| 8,022,843 B2 * | 9/2011 | Mitchell | ................ | H01Q 1/007 340/945 |
| 8,336,609 B2 * | 12/2012 | Schwan | ................. | B64D 13/00 165/202 |
| 8,336,610 B2 * | 12/2012 | Centofante | ............ | B64D 13/08 165/235 |
| 8,344,912 B2 * | 1/2013 | Mitchell | ................ | H01Q 1/007 340/945 |
| 9,362,578 B2 * | 6/2016 | Patterson | .......... | H01M 8/04253 |
| 9,689,597 B2 * | 6/2017 | Kelnhofer | ............... | F25B 49/02 |
| 2004/0079099 A1 * | 4/2004 | Kumada | ............ | B60H 1/00742 62/244 |
| 2005/0172470 A1 * | 8/2005 | Cobb | ............... | G05B 19/41805 29/407.1 |
| 2006/0180648 A1 * | 8/2006 | Miller | ..................... | G01S 17/023 235/375 |
| 2007/0057121 A1 * | 3/2007 | Callahan | ................. | H02G 3/00 244/118.5 |
| 2008/0167833 A1 * | 7/2008 | Matsen | .................. | G01N 29/14 702/122 |
| 2009/0112349 A1 * | 4/2009 | Cobb | ....................... | B64F 5/10 700/114 |
| 2011/0199976 A1 | 8/2011 | Mitchell et al. | | |
| 2015/0233605 A1 * | 8/2015 | Bernhardt | ............ | G06F 9/5094 236/1 F |
| 2017/0064067 A1 * | 3/2017 | Hockenberry | .... | H04M 1/72533 |

FOREIGN PATENT DOCUMENTS

| | | |
|---|---|---|
| CN | 103941768 A | 7/2014 |
| CN | 204256370 U | 4/2015 |
| RU | 2247422 C1 | 2/2005 |
| RU | 2287174 C1 | 11/2006 |

OTHER PUBLICATIONS

Extended European Search Report dated Apr. 18, 2017 for Application No. 16200450.1-1802.
Federal Service for Intellectual Property (FIPS) Office Action for Application No. 2016135699/11 dated Feb. 12, 2020.
Japanese Office Action for Application No. 2016220678 dated Jul.7, 2020.
Chinese Office Action for Application No. 201611048769.6 dated Mar. 31, 2021.

* cited by examiner

COMPUTER AIDED MEASURING SYSTEM (CAMS) TEMPERATURE REPORTERS

BACKGROUND

Field

The present disclosure generally relates to the manufacture, fabrication, assembly, testing, and maintenance of large scale flexible structures. More specifically, the present disclosure generally relates to a system and method for controlling and maintaining the temperature of a large scale structure in an effort to minimize expansion and/or contraction of components, during operation of a Computer Aided Measuring System (CAMS).

Description of the Related Art

During the manufacture or fabrication of structures comprising metals, inconsistent temperature exposure negatively affects the location accuracies of close tolerance parts. Smaller assemblies (e.g., small scale structures) fabricated under adverse temperature conditions are commonly housed in temperature controlled rooms so that each part of the smaller assembly is maintained at or near the same temperature during fabrication. However, large scale structures (e.g., aircraft, bridges, and building components) are subjected to movement and/or distortion caused by temperature related environments where one or more parts of the extended, large scale structure are at different temperatures relative to each other. Based on material properties, such temperature variances can induce undesirable movement and/or warping of the large scale structure. The movement of the structure affects processes such as close tolerance measurements, alignment of critical locations, and build-up of tolerances in assembled components.

Various steps within aircraft manufacturing processes require precise measurements with tolerances less than 0.010 of an inch over scales of several feet. In order to obtain such accuracies, the surface and/or ambient air temperature of aircraft structures and/or their surroundings must be stable and uniform for the duration of these high precision manufacturing processes. Current manufacturing conditions utilize temperature controlled areas to ensure stable and uniform temperatures during the manufacturing process in order to allow the entire structure being manufactured to reach a stable temperature. However, large scale structures are not well suited for temperature controlled rooms. Furthermore, current manufacturing processes avoid activities that may change the temperature of the manufacturing structure or the ambient air surrounding the manufacturing structure.

Rather, aircraft manufacturing takes place in large hangars where multiple aircraft are being worked on simultaneously. Multiple factors, including the opening and closing of the hangar doors, weather changes, sunlight exposure, and/or other work underway within the hangar or on the aircraft structure, affect the temperature of the aircraft structure or parts of the aircraft structure. Furthermore, during aircraft manufacturing, the aircraft structure may have Computer Aided Measuring Systems (CAMS) processes being performed thereon. A structure or surface when measured by CAMS must remain at a constant temperature within a minimum amount of variance. Any heating or cooling of the aircraft structure and/or parts of the aircraft structure may invalidate the CAMS data as expansion or contraction may misalign critical locations. This adverse condition contributes to heating or cooling expansion of the structure while the measuring process is taking place.

Therefore, what is needed in the art is a CAMS temperature reporter for monitoring and controlling the temperature of large scale structures undergoing manufacture, fabrication, assembly, testing, maintenance, and/or measurement, such as an aircraft structure.

SUMMARY

Examples disclosed herein relate to methods and apparatus for controlling the temperature of large scale structures during manufacturing operations. A structure or surface when measured by Computer Aided Measuring Systems (CAMS) preferably remains a predetermined constant temperature with minimum variance. A manufacturing system includes a first temperature sensor, a second temperature sensor, a plurality of temperature regulation devices, and a processor, all in wireless communication. During performance of a CAMS process on a large scale structure or surface, multiple recorded temperature values of the structure or surface are communicated. A determination is made based on the recorded temperature values to operate the plurality of temperature regulation devices to control the temperature of targeted areas of the structure or surface. The temperature regulation devices are monitored and controlled such that the structure or surface is stabilized and distortion is prevented during the CAMS process.

In one example, a manufacturing system for an aircraft structure is disclosed. The manufacturing system includes a first temperature sensor, a second temperature sensor, a plurality of temperature regulation devices, and a processor. The first temperature sensor is located within a first region and the second temperature sensor is located within a second region. The processor is wirelessly in communication with the first temperature sensor and the second temperature sensor. The processor is operatively connected with each of the plurality of temperature regulation devices. The processor stores logic for controlling the first temperature sensor, the second temperature sensor, and the plurality of temperature regulation devices. The processor is further configured to receive data from the first temperature sensor and the second temperature sensor and control each of the temperature regulation devices individually or synchronized.

In one example, a non-transitory computer-readable storage medium, storing instructions that, when executed by a processor, cause the processor to control the temperature of a large scale structure for manufacturing operations is disclosed. The processor performs the steps of receiving a temperature reading from a plurality of sensors coupled to the large scale structure and determining a temperature variance between the plurality of sensors. The processor further performs the steps of operating a plurality of temperature regulation devices, such that the temperature reading of each of the plurality of sensors is maintained within four degrees Fahrenheit of each other and initiating operation of a Computer Aided Measuring System if the temperature variance between each of the plurality of sensors is four degrees Fahrenheit or less. The processor may also perform the step of ceasing operation of the Computer Aided Measuring System if the temperature variance between each of the plurality of sensors is greater than four degrees Fahrenheit.

In one example, a method for controlling the temperature of a large scale structure for manufacturing operations is disclosed. The method includes receiving a temperature reading from a plurality of sensors coupled to the large scale structure and determining a temperature variance between the plurality of sensors. The method further includes operating a plurality of temperature regulation devices, such that the temperature reading of each of the plurality of sensors is maintained within four degrees Fahrenheit of each other and initiating operation of a Computer Aided Measuring System if the temperature variance between each of the plurality of sensors is four degrees Fahrenheit or less. The method also includes ceasing operation of the Computer Aided Measuring System if the temperature variance between each of the plurality of sensors exceeds four degrees Fahrenheit.

DETAILED DESCRIPTION

Examples disclosed herein generally relate to methods and apparatus for controlling the temperature of large scale structures during manufacturing operations. A structure or surface when measured by Computer Aided Measuring Systems (CAMS) preferably remains a determined constant temperature with minimum variance. The manufacturing system includes a first temperature sensor, a second temperature sensor, a plurality of temperature regulation devices, and a processor, all in wireless communication. During performance of a CAMS process on a large scale structure or surface, a recorded temperature value of the structure or surface is communicated. A determination is made based on the recorded temperature value to operate the plurality of temperature regulation devices to control the temperature of targeted areas of the structure or surface. The temperature regulation devices are monitored and controlled such that the structure or surface is stabilized and distortion is prevented during the CAMS process.

The term "manufacturing process" as used herein includes, for example, any manufacturing process, design process, prototyping process, fabrication process, assembly process, testing process, or maintenance process performed with reference to a structure or surface. It is contemplated that the term "manufacturing process" is not intended to be limiting and may include various examples beyond those described.

Figure 1:
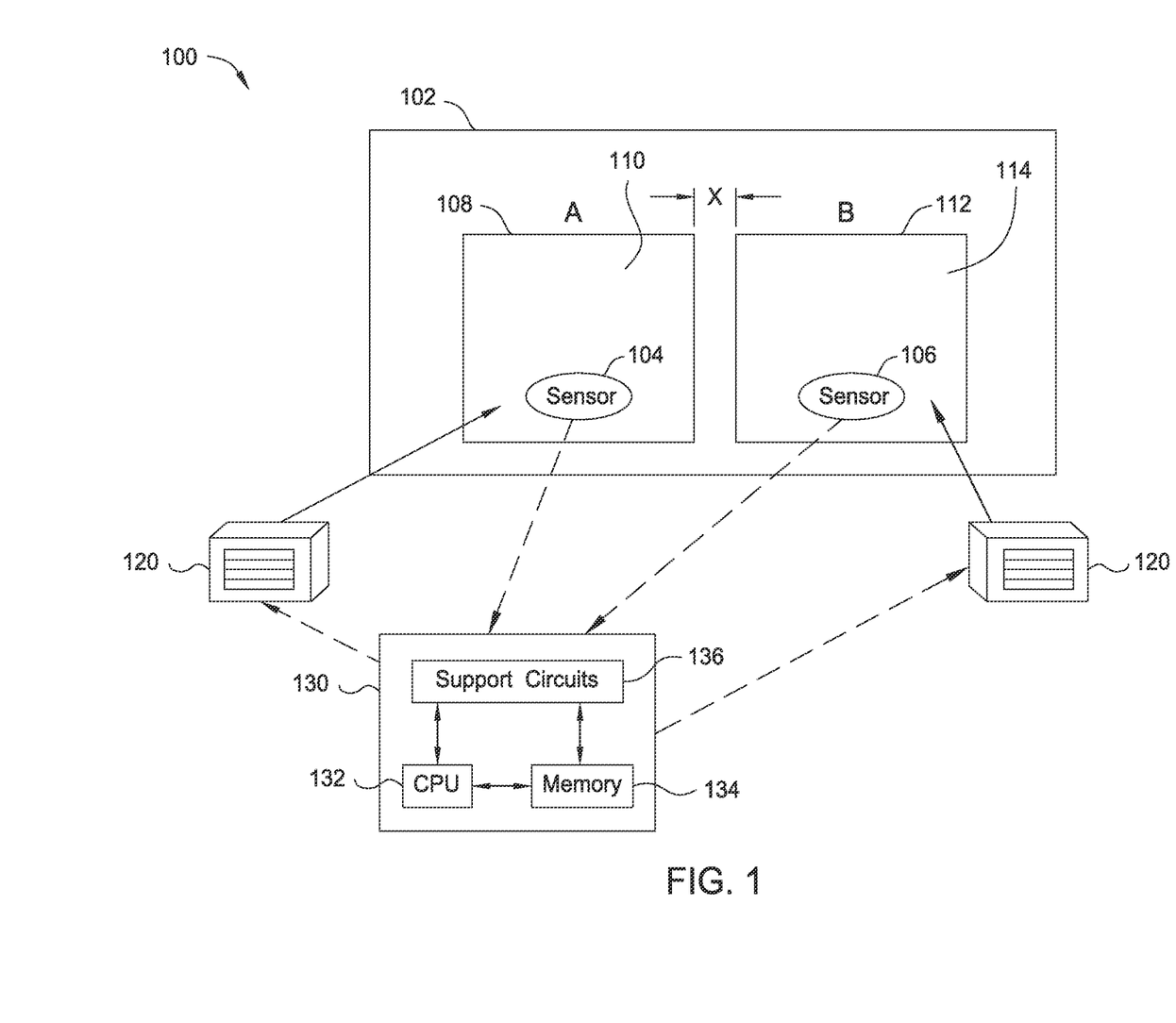
FIG. 1 schematically illustrates a manufacturing system positioned on a large scale structure, according to one example described herein.

FIG. 1 is a schematic illustration of a manufacturing system 100 positioned on a large scale structure 102. The manufacturing system 100 includes a first sensor 104 and a second sensor 106. In some examples, the first sensor 104 and/or the second sensor 106 may be a first temperature sensor and/or a second temperature sensor. In some examples, the first temperature sensor may be a first ambient air temperature sensor. In other examples, the first temperature sensor may be a first surface temperature sensor. In some examples, the second temperature sensor may be a second ambient air temperature sensor. In other examples, the second temperature sensor may be a second surface temperature sensor. The first sensor 104 and/or the second sensor 106 may be a contact sensor or a non-contact sensor, for example, a thermocouple sensor, a resistance temperature detector (RTD), a capillary/bulb thermometer, a bi-metal sensor, or a thermistor.

Although a first sensor 104 and a second sensor 106 are shown, it is contemplated that any number of sensors may be utilized within various examples of the manufacturing system 100. The first sensor 104 is located within a first region 108. The first sensor 104 is configured to sense a temperature of ambient air within or near the first region 108 and/or a temperature of a first surface 110 located within the first region 108. The second sensor 106 is located within a second region 112. The second sensor 106 is configured to sense a temperature of ambient air within or near of the second region 112 and/or a temperature of a second surface 114 located within the second region 112. The first region 108 and the second region 112 are spaced apart by a distance X. However, in some examples, the first region 108 and the second region 112 may overlap. In some examples, distance X may be between about one foot and about 250 feet, such as between about one foot and about 200 feet.

The manufacturing system 100 further includes a plurality of temperature regulation devices 120. Each temperature regulation device 120 is a heating device and/or a cooling device. In some examples, the first region 108 may have a temperature regulation device 120 for regulating the temperature of the first region 108 and the second region 112 may have a temperature regulation device 120 for regulating the temperature of the second region 112. In other examples, the first region 108 and the second region 112 may each utilize the same temperature regulation device 120. In certain examples, each of the first region 108 and/or the second region 112 may have two or more temperature regulation devices 120, a first temperature regulation device 120 for providing heating and a second temperature regulation device 120 for providing cooling. The temperature regulation devices 120 may be of any suitable form, for example, an air conditioning unit for blowing heated or chilled air, a heating coil, and/or a heat lamp.

The manufacturing system 100 also includes a controller 130. The controller 130 is in communication with the first sensor 104 and the second sensor 106. In some examples, the controller 130 is in wireless communication with the first sensor 104 and the second sensor 106. Wireless communication includes a wireless connection via, for example, a Bluetooth connection, a near field communication (NFC) signal, a radio frequency (RF) signal, a Wi-Fi connection, a ZigBee communication protocol, and/or a mobile personal area network. The controller 130 is operatively connected with each of the plurality of temperature regulation devices 120. In some examples, the controller 130 is in wireless communication with each of the plurality of temperature regulation devices 120.

The controller 130 stores logic for controlling the first sensor 104, the second sensor 106, and the plurality of temperature regulation devices 120. The controller 130 is configured to receive data from the first sensor 104 and the second sensor 106. The controller 130 is further configured to control each of the plurality of temperature regulation devices 120. In some examples, the controller 130 further stores logic for controlling a CAMS. CAMS may operate and/or run during a high precision manufacturing operation and provide for the real-time visualization of components or parts against the nominal location in order to construct structures or assemblies that require close tolerances. Furthermore, CAMS allows operators to easily make adjustments to component locations and, therefore, produce structures and assemblies that consistently meet the precise functional specifications. However, if the structure or assembly is exposed to extreme temperatures and/or a temperature variance exists across sections of the structure or assembly, the CAMS data may be invalid as the structure or assembly may expand or contract. As such, the temperature of the structure or assembly is to remain constant or within a known predetermined temperature range during the manufacturing process such that the CAMS does not need to be shut down for a lack of valid data. Therefore, the controller 130 is configured to signal the CAMS system to shut down if the controller 130 receives data from the first sensor 104 or the second sensor 106 outside of a predetermined data range. The predetermined data range may be a predetermined temperature range.

The above-described manufacturing system 100 is controlled by a processor based system, such as controller 130. For example, the controller 130 may be configured to control functioning of each of the temperature regulation devices 120, temperature of the output from each of the temperature regulation devices 120, flow of the output from each of the temperature regulation devices, and/or flow direction of the output from each of the temperature regulation devices, during different operations of the manufacturing process. The controller 130 includes a programmable central processing unit (CPU) 132 that is operable with a memory 134 and a mass storage device, an input control unit, and a graphical user interface 140 (e.g., a display unit), and includes power supplies, clocks, cache, input/output (I/O) circuits, and the like, coupled to the various components of the manufacturing system 100 to facilitate control of the ongoing manufacturing processes. The controller 130 also includes hardware for monitoring air and/or surface temperatures via at least the first sensor 104 and the second sensor 106.

To facilitate control of the manufacturing system 100 described above, the CPU 132 may be one of any form of general purpose computer processor that can be used in an industrial setting, such as a programmable logic controller (PLC), for controlling various sub-processors. The memory 134 is coupled to the CPU 132. The memory 134 is non-transitory and may be one or more of readily available memory such as random access memory (RAM), read only memory (ROM), floppy disk drive, hard disk, or any other form of digital storage, local or remote. Support circuits 136 are coupled to the CPU 132 for supporting the processor in a conventional manner. Cooling, heating, and other processes are generally stored in the memory 134, typically as a software routine. The software routine may also be stored and/or executed by a second CPU (not shown) that is remotely located from the hardware being controlled by the CPU 132.

The memory 134 is in the form of a non-transitory computer-readable storage media that contains instructions, that when executed by the CPU 132, facilitates the operation of the manufacturing system 100. The instructions in the memory 134 are in the form of a program product such as a program that implements the method of the present disclosure. The program code may conform to any one of a number of different programming languages. In one example, the disclosure may be implemented as a program product stored on computer-readable storage media for use with a computer system. The program(s) of the program product define functions of the examples (including the methods described herein). Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are examples of the present disclosure.

The controller 130 receives a temperature reading from the first sensor 104 and the second sensor 106. The controller 130 operates the temperature regulation devices 120 by signaling the temperature regulation devices 120 to activate and cool large scale structure 102 until the temperature reading of the second sensor 106 is synchronized and maintained within the temperature reading of the first sensor 104 within four degrees Fahrenheit. The controller 130 reads the temperatures of the first sensor 104 and the second sensor 106 and turns on and off the temperature regulation device 120 that controls the second region 112 such that the temperature of the second region 112 matches the temperature of the first region 108 of the first sensor 104 within four degrees Fahrenheit. As such, the second sensor 106 may be a slave to the first sensor 104. In some examples, the temperature of the first region 108 may vary based off of an ambient temperature and the temperature of the second region 112 will match the temperature of the first region 108.

In some examples, the controller 130 is wirelessly in communication with the first sensor 104 and the second sensor 106. The controller 130 assigns the first sensor 104 or the second sensor 106 as the temperature reporter (e.g., master) based on the sensor reporting an extreme temperature reading. Regardless of the number of sensors located on or in a structure, the controller 130 may identify one sensor as the reporter sensor. The reporter sensor may alternate between the first sensor 104 and the second sensor 106, or a plurality of sensors, based on the array of structure temperatures. The controller 130 may send a signal wirelessly to operate each temperature regulation device 120 in an effort to match the temperature recorded by the reporter. This process allows for each temperature regulation device 120 to apply a specific temperature at each sensor and/or region based on the variance between the temperature reading of the reporter and the given location of each sensor. By way of example only, and not intended to be limiting, if a first sensor is recording 80 degrees Fahrenheit at a first region of an aircraft structure exposed to an adverse temperature condition, and a second sensor at a second region located thirty feet from the first region is recording 70 degrees Fahrenheit, the first sensor is designated the reporter by the controller 130. As the temperature of the overall structure goes through a state of temperature changes due to various conditions, the controller 130 may assign the role of reporter to the sensor recording the extreme temperature. Thus, each temperature regulation device 120 may omit a volume and/or a range of air—hot or cold—to expedite the cooling process in an effort to stabilize the temperature of the sensors to match the temperature of the reporter.

The controller 130 performs multiple functions including collecting input data from multiple sensors, such as the first sensor 104 and the second sensor 106, and processing decisions on stabilizing the overall temperature of the large scale structure 102. The controller 130 further controls heating and/or cooling of the large scale structure 102 via the temperature regulation devices 120 simultaneously, and operates electrical solenoids, mechanical solenoids, heating and cooling vents, and heating and cooling registers. The controller 130 further signals, via an audio signal or a visual indication, a notification in advance of potential non-compliance issues in temperature or movement of the large scale structure 102. The controller 130 further records historical data of movement and temperature. The controller 130 further initiates and/or ceases operation of a CAMS if the temperature variance between each of the sensors is within and/or exceeds a predefined range.

Figure 2:
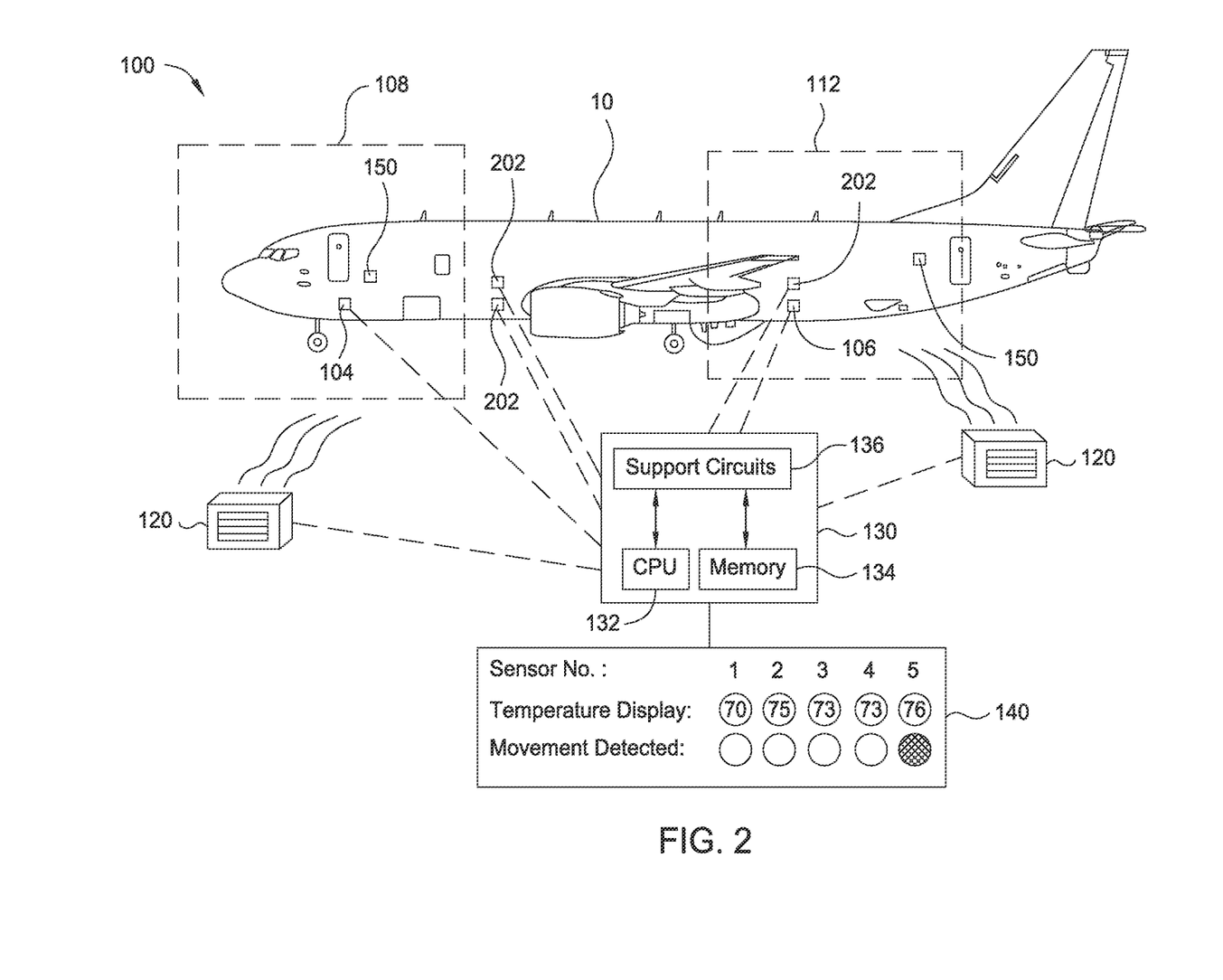
FIG. 2 schematically illustrates a side view of a manufacturing system positioned on an aircraft, according to one example described herein.

FIG. 2 schematically illustrates a side view of manufacturing system 100 positioned on an aircraft 10, according to one example. The first sensor 104 is located within the first region 108, shown in phantom. The second sensor 106 is located within the second region 112, shown in phantom. The first sensor 104 and the second sensor 106 may be located on or near either the exterior of the aircraft 10 or the interior of the aircraft 10. As shown, additional sensors 202 may be located on or near an exterior or an interior of the aircraft. The additional sensors 202 are substantially similar to the first sensor 104 and/or the second sensor 106 described supra. The additional sensors 202 are located in additional individual regions (not shown) as needed. As shown, the first sensor 104 and the second sensor 106 are in wireless communication with the controller 130.

The temperature regulation devices 120 may be located on or in an exterior of the aircraft 10 and/or on or in an interior of the aircraft 10. Furthermore, in some examples, the aircraft 10 may provide the source of refrigeration or heating via built in cooling/heating systems. The built in cooling/heating systems may be utilized to cool and/or heat other areas of the aircraft 10 by redirecting chilled or heated air to areas of need via a duct. For example, suitable areas for redirection of chilled or heated air may include the electrical equipment (EE) bay. In other examples, portable temperature regulation devices 120 may be placed throughout the interior or exterior of the aircraft 10.

In some examples, the controller 130 is operatively connected with a graphical user interface 140. The graphical user interface 140 displays information related to the first sensor 104 and the second sensor 106, for example, the temperature reading of the first sensor 104 and the second sensor 106, and/or the ambient temperature reading. In some examples, the graphical user interface 140 also displays information relating to movement of the large scale structure 102 detected via a plurality of movement sensors 150 (See, infra). For example, if movement is detected in relation to a particular sensor (e.g., Sensor No. 5), graphical user interface 140 may indicate the movement by changing a display element on the graphical user interface 140 corresponding to that particular sensor.

In some examples, the manufacturing system 100 further includes a plurality of movement sensors 150. The plurality of movement sensors 150 may be, for example, a plurality of accelerometers. Each movement sensor 150 is in wireless communication with the controller 130. The controller 130 is configured to receive data from each of the plurality of movement sensors 150. Furthermore, the controller 130 is configured to signal the CAMS to shut down if data received from the plurality of movement sensors 150 is outside of a predetermined data range.

Figure 3:
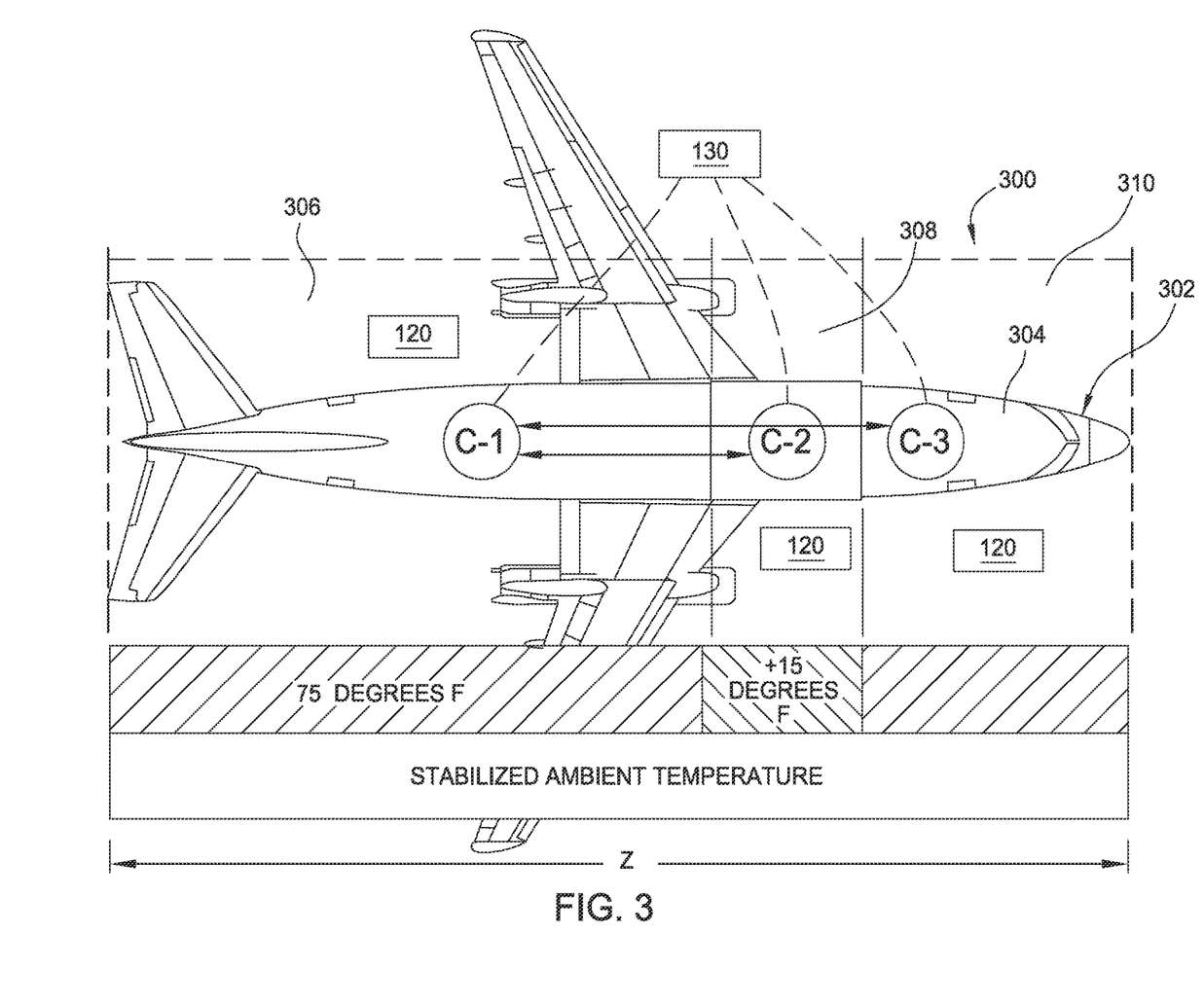
FIG. 3 schematically illustrates a top view of an aircraft having a Computer Aided Measuring System (CAMS) process performed thereon, according to one example described herein.

FIG. 3 illustrates an example of a system 300 including a CAMS measuring locations across distances of an aircraft 302 during an aircraft manufacturing process. As shown, the aircraft 302 may have a length of Z, for example, about 120 feet. By way of example, the aircraft 302 has three sensors for monitoring and taking temperature measurements at three distinct locations on or in the aircraft 302. The sensors are the same as or substantially similar to the first sensor 104 and/or second sensor 106 described supra. One sensor may be located at each of locations labeled C-1, C-2, and C-3. The sensor at location C-1 measures a temperature of the fuselage 304 within the first region 306. The sensor at location C-2 measures a temperature of the fuselage 304 within the second region 308. The sensor at location C-3 measures a temperature of the fuselage 304 within the third region 310. As discussed supra, during the manufacturing process, the fuselage 304 is to remain at a stabilized ambient temperature in order for the CAMS to provide accurate and precise data.

Testing has been performed and data collected for various manufacturing processes performed on an aircraft. Results show that reliable CAMS data is provided when temperatures read by the various sensors placed on or in the aircraft are within four degrees Fahrenheit of each other. As such, the temperature regulation devices are controlled by the controller 130 such that the first sensor 104 and the second sensor 106 provide a temperature reading within four degrees Fahrenheit of each other, such that the CAMS process is not interrupted. The plurality of sensors communicate temperature readings to the controller 130 which controls various locations on or in the aircraft and determines when to heat or cool the various locations so that precision manufacturing may take place within the close tolerances prescribed.

Returning to FIG. 3, any temperature variation greater than four degrees Fahrenheit reported by a sensor at any of locations C-1, C-2, or C-3 may invalidate the CAMS data, require the CAMS to be interrupted, and/or cause the manufacturing process to be delayed. As shown, the stabilized ambient temperature of the system 300 may be, for example, 75 degrees Fahrenheit. In some examples, the stabilized ambient temperature may be preselected depending on the manufacturing process to occur. By way of continued example, the sensor at location C-1 and the sensor at location C-3 indicate a temperature recorded within four degrees of the stabilized ambient temperature in each of the first region 306 and the third region 310. However, the sensor at location C-2 indicates a temperature recorded outside of the four degree Fahrenheit range (e.g., a temperature of 90 degrees Fahrenheit) within the second region 308, due to, for example, the use of electrical power within the second region 308. As such, the CAMS data is invalid and may indicate structure movement and/or warping due to the temperature variances. As a result, the manufacturing process may be delayed until the temperature recorded in the second region 308 returns to a temperature within four degrees Fahrenheit of the stabilized ambient temperature. Each of the first region 306, the second region 308, and the third region 310 includes a temperature regulation device 120, described supra. Each temperature regulation device 120 operates to maintain the temperature of the first region 306, the second region 308, and the third region 310 within four degrees Fahrenheit of the stabilized ambient temperature, such that the manufacturing process is not delayed and the CAMS data is not invalid.

Figure 4:
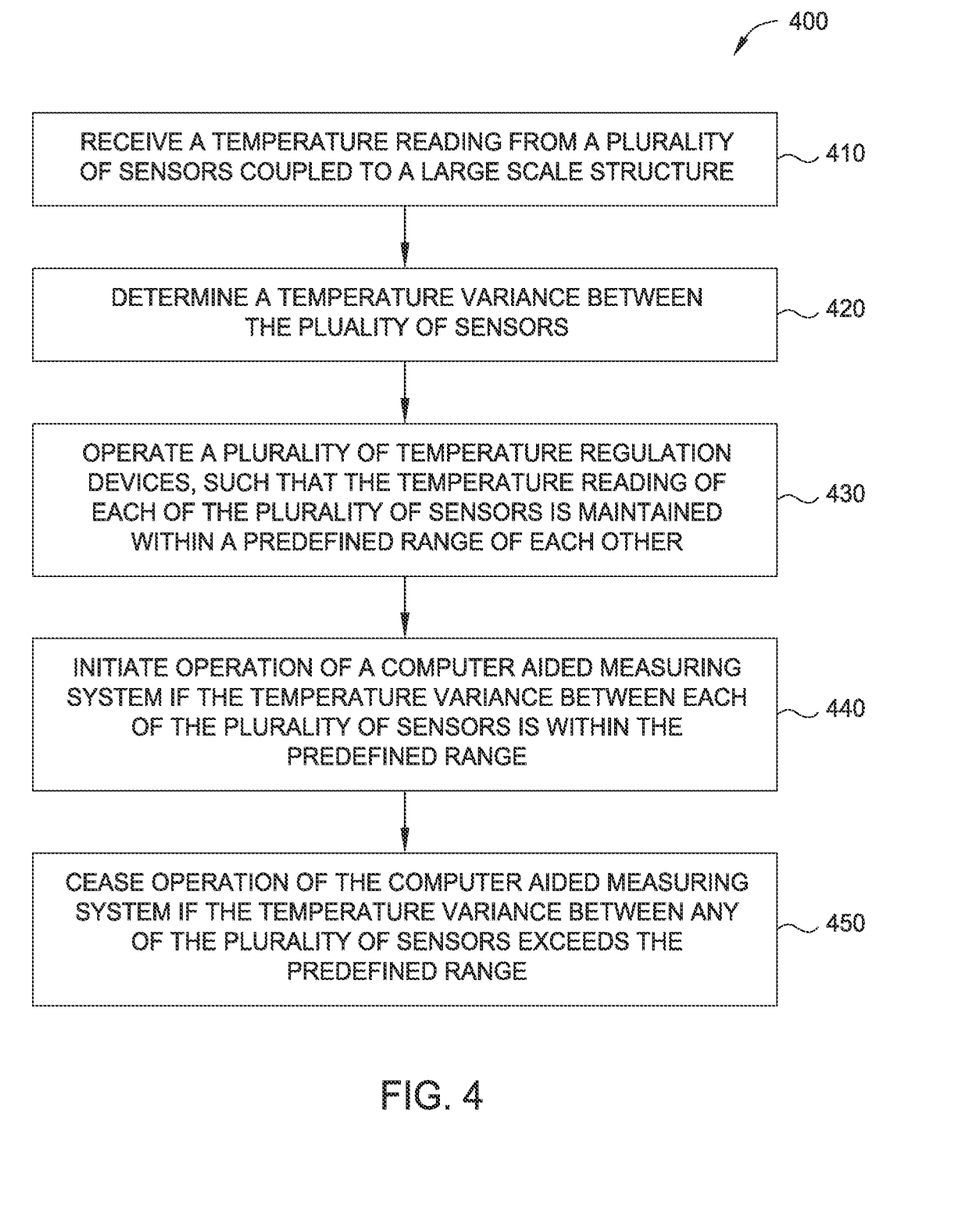
FIG. 4 schematically illustrates operations of a method for controlling the temperature of a large scale structure for manufacturing operations, according to one example described herein.

FIG. 4 schematically illustrates operation of a method 400 for controlling the temperature of a large scale structure for manufacturing operations. In some examples, the large scale structure may be an aircraft. It is contemplated, however, that the large scale structure may also include bridges, buildings, spacecraft, and the like.

At operation 410, a temperature reading is received from a plurality of sensors coupled to the large scale structure. The temperature readings are received from the plurality of sensors via a wireless connection. In some examples, the temperature reading may be received from the plurality of sensors via a hardwired connection. At operation 420, a temperature variance is determined between the plurality of sensors.

At operation 430, a plurality of temperature regulation devices are operated such that the temperature reading of each of the plurality of sensors is maintained within a predefined range of each other. In some examples, the predefined range may be about four degrees Fahrenheit. Operating the plurality of temperature regulation devices includes sending a wireless signal to the plurality of temperature regulation devices, wherein the wireless signal turns the plurality of temperature regulation devices on or off, and/or indicates a temperature to which the temperature regulation device is to heat and/or cool the target structure or area.

At operation 440, the operation of a CAMS is initiated if the temperature variance between each of the plurality of sensors is within the predefined range. At operation 450, operation of the CAMS is ceased if the temperature variance between any of the plurality of sensors exceeds the predefined range.

The method 400 may further include receiving an indication from a movement sensor coupled with the large scale structure (e.g. large area structure), determining if the indication is outside of a predefined acceptable movement range, and ceasing operation of the CAMS if the indication is outside of the predefined acceptable movement range.

Benefits of the present disclosure include the stabilization of multiple large scale structure components in real time during a manufacturing process regardless of exposure to temperature variances in order to maintain close tolerance measurements, align critical locations, and build up tolerances in critical components. Additional benefits include compact sensor sizes for easy positioning and movement, and wireless connections between components of the manufacturing system. Wireless connections allow for additional manufacturing operations to continue expeditiously and concurrently during the manufacturing process without the interference of wires and other physical connections. As such, additional personnel can perform other assembly functions on the large scale structure while the CAMS operation is taking place.

Additional benefits include up time of the CAMS, as well as improved accuracy of CAMS data. Furthermore, a reduction in total manufacturing time is realized in that multiple processes may occur at the same time. Additionally, the plurality of heating and cooling devices establish and maintain a uniform temperature during the manufacturing process such that the manufacturing process does not shut down, thus saving time and lowering overall costs.

It should be noted, while reference is made throughout the disclosure to a large scale structure, an aircraft, an aircraft structure, or an aircraft fuselage, it is contemplated that the present disclosure may be utilized for manufacturing systems, operations, or testing needs with respect to various other structures of various sizes.

The descriptions of the various examples of the present invention have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein.

In the following, reference is made to examples presented in this disclosure. However, the scope of the present disclosure is not limited to specific described examples. Instead, any combination of the following features and elements, whether related to different examples or not, is contemplated to implement and practice contemplated examples. Furthermore, although examples disclosed herein may achieve advantages over other possible solutions or over the prior art, whether or not a particular advantage is achieved by a given example is not limiting of the scope of the present disclosure. Thus, the following aspects, features, examples, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While the foregoing is directed to examples of the present invention, other and further examples of the invention may be devised without departing from the basic scope thereof, and the scope thereof is determined by the claims that follow.

What is claimed is:

1. A manufacturing system for an aircraft structure, comprising:
    a first temperature sensor located within a first region;
    a second temperature sensor located within a second region;
    a Computer Aided Measuring System;
    a plurality of temperature regulation devices; and
    a controller wirelessly in communication with the first temperature sensor and the second temperature sensor and operatively connected with each of the plurality of temperature regulation devices, the controller configured to receive data from the first temperature sensor and the second temperature sensor and control each of the temperature regulation devices, the controller comprising logic for:
        controlling the first temperature sensor, the second temperature sensor, and the plurality of temperature regulation devices, and
        controlling the Computer Aided Measuring System, wherein the controller is configured to signal the Computer Aided Measuring System to shut down if the controller determines a difference between a temperature measured by the first temperature sensor and a temperature measured by the second temperature sensor exceeds a predetermined range.

2. The manufacturing system of claim 1, wherein the controller is operatively connected with each of the plurality of temperature regulation devices via a wireless connection.

3. The manufacturing system of claim 1, wherein each temperature regulation device is a heating and cooling device.

4. The manufacturing system of claim 1, wherein the controller is wirelessly in communication with the first temperature sensor and the second temperature sensor via at least one of a Bluetooth connection, a near field communication signal, a radio frequency signal, a Wi-Fi connection, a ZigBee communication protocol, and/or a mobile personal area network.

5. The manufacturing system of claim 1, wherein the first temperature sensor and the second temperature sensor are each an ambient air temperature sensor or a surface temperature sensor.

6. The manufacturing system of claim 1, wherein the first temperature sensor or the second temperature sensor are located on an interior of the aircraft structure or on an exterior of the aircraft structure.

7. The manufacturing system of claim 1, wherein the first region and the second region are spaced apart by a distance of between about one foot and about 200 feet.

8. The manufacturing system of claim 1, further comprising a plurality of movement sensors, wherein each movement sensor is wirelessly in communication with the controller, and wherein the controller is configured to receive data from the plurality of movement sensors.

9. The manufacturing system of claim 8, wherein the controller is configured to signal the Computer Aided Measuring System to shut down if data received from the plurality of movement sensors is outside of a predetermined data range.

10. The manufacturing system of claim 1, wherein the plurality of temperature regulation devices include one or more of an air conditioning unit, a heating coil, and a heat lamp.

11. The manufacturing system of claim 1, wherein the first temperature sensor comprises a resistance temperature detector.

12. The manufacturing system of claim 1, wherein the second temperature sensor comprises a resistance temperature detector.

13. A non-transitory computer-readable storage medium, storing instructions that, when executed by a processor of a controller, cause the processor to control a temperature of a large scale structure for manufacturing operations by performing the operations of:
receiving, at the controller, a temperature reading from a plurality of sensors coupled to the large scale structure, the plurality of sensors including at least a first temperature sensor located within a first region and a second temperature sensor located within a second region, the controller in wireless communication with first temperature sensor and the second temperature sensor and comprising logic for controlling the first temperature sensor and the second temperature sensor;
determining, by the controller, a temperature variance between temperatures measured by at least the first temperature sensor and the second temperature sensor of the plurality of sensors;
operating, by the controller, a plurality of temperature regulation devices, such that the temperatures measured by at least the first temperature sensor and the second temperature sensor of the plurality of sensors is maintained within a predefined range of each other, the controller operatively connected with each of the temperature regulation devices of the plurality of temperature regulation devices and comprising logic for controlling each of the temperature regulation devices of the plurality of temperature regulation devices;
initiating, by the controller, operation of a Computer Aided Measuring System if the temperature variance between the temperatures measured by at least the first temperature sensor and the second temperature sensor of the plurality of sensors is within the predefined range; and
ceasing, by the controller, operation of the Computer Aided Measuring System if a temperature difference between the temperatures measured by any of the plurality of sensors exceeds the predefined range.

14. The non-transitory computer-readable storage medium of claim 13, wherein the predefined range is about four degrees Fahrenheit.

15. The non-transitory computer-readable storage medium of claim 13, further comprising:
receiving an indication from a movement sensor coupled to the large scale structure;
determining the if the indication is outside of a predefined acceptable movement range; and
ceasing operation of the Computer Aided Measuring System if the indication is outside of the predefined acceptable movement range.

16. The non-transitory computer-readable storage medium of claim 13, wherein the operating the plurality of temperature regulation devices comprises sending a wireless signal to the plurality of temperature regulation devices, wherein the wireless signal turns the plurality of temperature regulation devices on or off and indicates a temperature to which the temperature regulation devices are to heat or cool.

17. A method for controlling a temperature of a large scale structure for manufacturing operations, comprising:
receiving, at a controller, a temperature reading from a plurality of sensors coupled to the large scale structure, the plurality of sensors including at least a first temperature sensor located within a first region and a second temperature sensor located within a second region, the controller in wireless communication with first temperature sensor and the second temperature sensor and comprising logic for controlling the first temperature sensor and the second temperature sensor;
determining, by the controller, a temperature variance between temperatures measured by at least the first temperature sensor and the second temperature sensor of the plurality of sensors;
operating, by the controller, a plurality of temperature regulation devices, such that the temperatures measured by at least the first temperature sensor and the second temperature sensor of the plurality of sensors is maintained within a predefined range of each other, the controller operatively connected with each of the temperature regulation devices of the plurality of temperature regulation devices and comprising logic for controlling each of the temperature regulation devices of the plurality of temperature regulation devices;
initiating, by the controller, operation of a Computer Aided Measuring System if the temperature variance between the temperatures measured by at least the first temperature sensor and the second temperature sensor of the plurality of sensors is within the predefined range; and
ceasing, by the controller, operation of the Computer Aided Measuring System if a temperature difference between the temperatures measured by any of the plurality of sensors exceeds the predefined range.

18. The method of claim 17, wherein the predefined range is about four degrees Fahrenheit.

19. The method of claim 17, further comprising:
receiving an indication from a movement sensor coupled to the large scale structure;
determining the if the indication is outside of a predefined acceptable movement range; and
ceasing operation of the Computer Aided Measuring System if the indication is outside of the predefined acceptable movement range.

20. The method of claim 17, wherein the operating the plurality of temperature regulation devices comprises sending a wireless signal to the plurality of temperature regulation devices, wherein the wireless signal turns the plurality of temperature regulation devices on or off and indicates a temperature to which the temperature regulation devices are to heat or cool.

\* \* \* \* \*

UNITED STATES PATENT AND TRADEMARK OFFICE
CERTIFICATE OF CORRECTION

| | |
|---|---|
| PATENT NO. | : 11,118,849 B2 |
| APPLICATION NO. | : 14/954079 |
| DATED | : September 14, 2021 |
| INVENTOR(S) | : Mark D. Bumgardner et al. |

It is certified that error appears in the above-identified patent and that said Letters Patent is hereby corrected as shown below:

In the Claims

In Column 12, Line 10, in Claim 15, after "determining" delete "the".

In Column 12, Line 63, in Claim 19, after "determining" delete "the".

Signed and Sealed this
Seventh Day of February, 2023

*Katherine Kelly Vidal*

Katherine Kelly Vidal
*Director of the United States Patent and Trademark Office*